United States Patent [19]

Hecht

[11] Patent Number: 5,221,833
[45] Date of Patent: Jun. 22, 1993

[54] METHODS AND MEANS FOR REDUCING BIT ERRORS RATES IN READING SELF-CLOCKING GLYPH CODES

[75] Inventor: David L. Hecht, Palo Alto, Calif.

[73] Assignee: Xerox Corporation, Stamford, Conn.

[21] Appl. No.: 815,005

[22] Filed: Dec. 27, 1991

[51] Int. Cl.⁵ .............................................. G06K 19/06
[52] U.S. Cl. ..................................... 235/494; 235/487
[58] Field of Search ......................... 235/454, 487, 494

[56] References Cited

U.S. PATENT DOCUMENTS 5,128,525  7/1992  Stearns et al. ...................... 235/494

FOREIGN PATENT DOCUMENTS 193290  8/1988  Japan ................................. 235/487

Primary Examiner—John Shepperd

[57] ABSTRACT

The glyphs of a self-clocking glyph code for encoding n-bit long multi-bit digital values are preordered in a cyclical sequence, based on their analytically or empirically determined probabilities of being confused with each other, such that each glyph is adjacent in that sequence to the two glyphs with which it is more likely to be confused during decoding. Binary encoding values then are assigned to these ordered glyphs in accordance with an n-bit long Gray code sequence, so that the value assigned to any given glyph differs in just one bit position from the values assigned to the glyphs with which it is most likely to be confused.

6 Claims, 1 Drawing Sheet

METHODS AND MEANS FOR REDUCING BIT ERRORS RATES IN READING SELF-CLOCKING GLYPH CODES

FIELD OF THE INVENTION

This invention relates to self-clocking glyph codes for encoding machine readable digital information on hardcopy recording media and, more particularly, to Gray-coded self-clocking glyph codes for graphically encoding multi-bit digital values.

BACKGROUND OF THE INVENTION

Self-clocking glyph codes are suitable for transferring digital values of various types (e.g., machine control instructions, data values, memory pointers, and executable binaries) back and forth synchronously between the electronic and hardcopy domains. They, therefore, are a promising interface technology for integrating hardcopy documents and computer controlled electronic document processing systems more or less seamlessly.

A self-clocking glyph code typically is generated by mapping logically ordered digital imput values of predetermined bit length, n, into a predefined set of $2^n$ graphically unique symbols (i.e., "glyphs"), each of which is preassigned to the encoding of a different one of the permissible input values. Thus, each of the input values is transformed into and encoded by a corresponding glyph. These glyph encodings, in turn, are written on a hardcopy recording medium in accordance with a predetermined spatial formatting rule, thereby producing a glyph code that encodes the input values and preserves their logical ordering.

As will be appreciated, a code of the foregoing type carries the clock signal that is required for transferring the encoded digital values from the hardcopy domain to the electronic domain synchronously. Every input value is represented by a corresponding glyph, so the clock is embedded in the spatial distribution of the logically ordered glyphs. This is why these codes are referred to as "self-clocking" glyph codes. It also is to be understood that the self-clocking characteristic of these codes increases their tolerance to the degradation they may suffer while being replicated by copiers and/or facsimile systems. See a copending and commonly assigned Bloomberg et al. U.S. patent application that was filed Jul. 31, 1990 under Ser. No. 07/560,514 on "Self-Clocking Glyph Shape Codes" which hereby is incorporated by reference.

Another of the known advantages of these self-clocking glyph codes is that they can be composed of glyphs that are graphically distinguished from each other by machine detectable characteristics that are not easily perceived by the human eye. Thus, these codes can be used for recording machine readable digital information on hardcopy documents, without significantly degrading the esthetic quality of those documents. For instance, the glyphs can be written using inks that are virtually invisible to the human eye under normal lighting conditions. Even more remarkably, glyphs written using visible inks, such as standard xerographic toners, can be of such a small uniform size and written at a sufficiently high spatial density that the resulting glyph code has a generally uniform textured appearance to the human eye. As pointed out in the aforementioned Bloomberg et al. application, digital values can be encoded in the rotation or profiles of such glyphs if the glyphs are rotationally variant or invariant, respectively. Also see the copending and commonly assigned U.S. patent applications of Rob F. Tow that were filed Dec. 27, 1990 under Ser. Nos. 07/634,990 and 07/634,371 on "Method and Means for Embedding Machine Readable Digital Data in Halftone Images" and "Psychophysically Enhanced Techniques for Embedding Machine Readable Data in Grayscale Images", respectively.

Prior self-clocking glyph codes are especially well suited for encoding single bit digital values ("1" or "0"). Some of these codes also are useful for encoding multi-bit values, but the cost and complexity of decoding these known codes tend to increase exponentially as a function of the bit lengths of the digital values that are encoded in their glyphs. This follows from the general rule that $2^n$ filtering steps are required for decoding a glyph code encoding of n-bit long digital values when $n>1$. Moreover, the encoding of multi-bit values in the glyphs of these existing codes typically is achieved at the cost of reducing the graphical distinctions between the glyphs, so techniques are needed for facilitating the reading (i.e., decoding) of these codes at acceptably low bit error rates.

SUMMARY OF THE INVENTION

In response to the above-defined need, the glyphs of a self-clocking glyph code for encoding n-bit long multi-bit digital values are preordered in a cyclical sequence, based on their analytically or empirically determined probabilities of being confused with each other, such that each glyph is adjacent in that sequence to the two glyphs with which it is more likely to be confused during decoding. Binary encoding values then are assigned to these ordered glyphs in accordance with an n-bit long Gray code sequence, so that the value assigned to any given glyph differs in just one bit position from the values assigned to the glyphs with which it is most likely to be confused.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to an illustrated embodiment, it is to be understood that there is no intent to limit it to that embodiment. On the contrary, the intent is to cover all alternatives, modifications and equivalents falling with the spirit and scope of the invention as defined by the appended claims.

Figure 1:
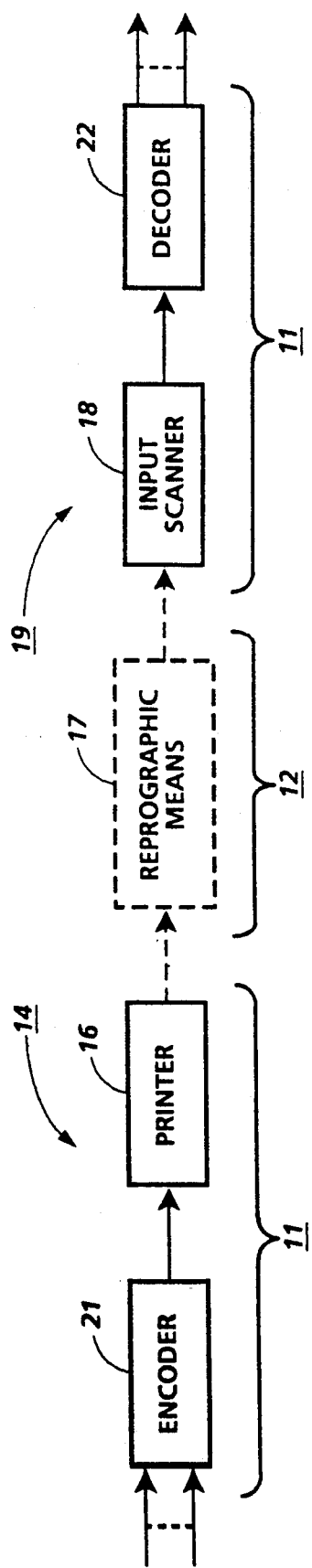
FIG. 1 is a simplified block diagram of a document processing environment in which the present invention may be utilized to advantage.
Figure 2:
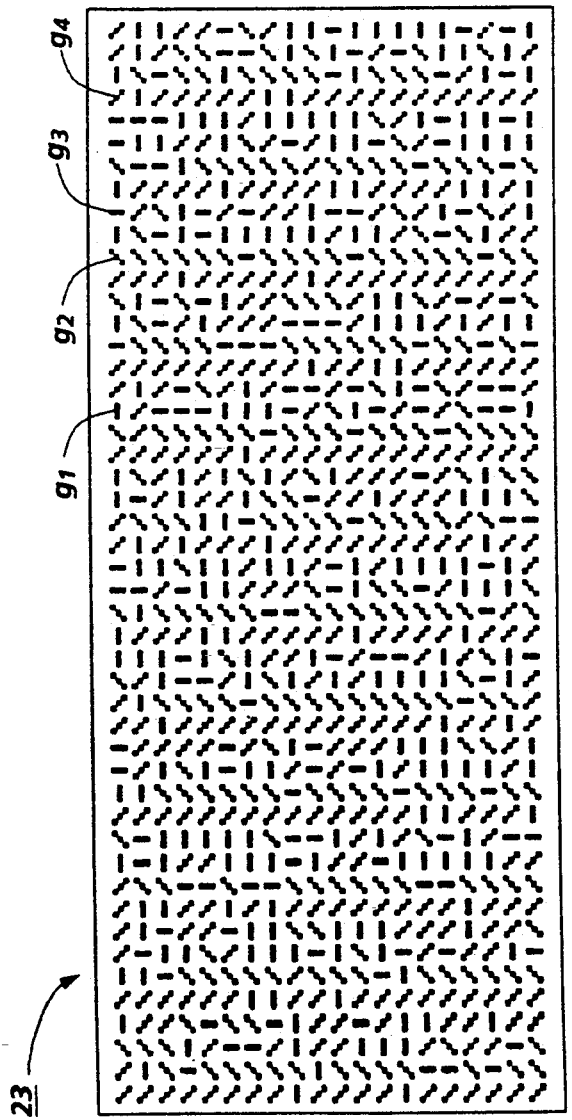
FIG. 2 is a print-out of a self-clocking glyph code that uses four more or less equally distributed angular orientations of a slash-like symbol for encoding dual bit digital values.

Turning now to the drawings, and at this point especially to FIG. 1, the operating environment for modern electronic document processing systems is becoming a hybrid environment in which human readable and machine readable information are transferred back and forth between an electronic domain 11 and a hardcopy domain 12. For example, images containing human readable and machine readable information may be composed within an electronic document processing system 14 (shown only in relevant part), and some or all of these images may then be transferred into the hardcopy domain 12 by a more or less conventional printer 16. The hardcopy image, in turn, may be replicated by various reprographic means 17, each as copiers and facsimile systems (not shown), so the replicated version of the hardcopy image may be degraded by optical and/or electrical distortion and/or noise. At any rate, an input scanner 18 may scan the original hardcopy image, or a copy of it, into the same or a different electronic document processing system 19 (also shown only in relevant part), thereby re-transferring the image, or a selected part of it, from the hardcopy domain 12 to the electronic domain 11. More particularly, as shown, the document processing systems 14 and 19 include an encoder 21 and a decoder 22, respectively, for transferring machine readable digital information back and forth between the electronic domain 11 and the hardcopy domain 12. Turning to FIG. 2, in the illustrated embodiment, the encoder 21 uses a predefined set of rotationally distinct glyphs $g_1$, $g_2$, $g_3$, and $g_4$ for encoding respective two bit long (i.e., dual bit) digital input values in a logically ordered sequence of such glyphs. These glyph encodings, in turn, are printed by the printer 16 on a hardcopy recording medium in accordance with a predetermined spatial formatting rule, thereby transferring the logically ordered encoded values to the hardcopy domain 12 in a self-clocking glyph code 23. As will be understood, the glyph code 23 may be printed by the printer 16 alone or in combination with other significant information (machine and/or human readable). When the glyph code accompanies additional information, the code typically is distinguished from the accompanying information by some machine recognizable attribute, such as by means of its location on the hardcopy recording medium or by means of its association with a machine recognizable header, border pattern or spatial frequency.

Figure 3:
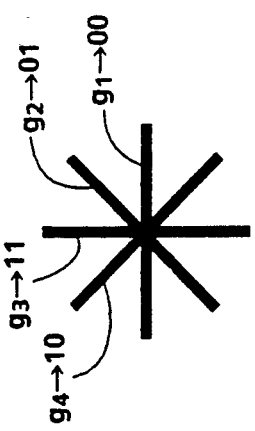
FIG. 3 is a diagram that illustrates a Gray code sequenced encoding of dual bit digital values in the rotational orientations of the glyphs contained by the code shown in FIG. 2.

In practice, there is a risk that the decoder 22 will be misidentify one or more of the glyphs while decoding the glyph code 23, thereby causing decoding errors. This risk typically is elevated when the decoder 22 is reading a degraded copy of the code 23, but some errors may occur even when the decoder 22 is reading an original image of the code 23. For example, the decoder 22 might confuse a glyph with one or the other of the glyphs that it most nearly resembles in angular orientation. Or, there may be empirical evidence that a glyph is even more likely to be confused with a glyph at some other angular orientation (although this is unlikely in the glyph code 23 because, as shown in FIG. 3, the angular orientations of the odd and even numbered glyph pairs $g_1$, $g_3$, and $g_2$, $g_4$, respectively are essentially orthogonal to each other). Irrespective, however, of whether the probability of confusing any two glyphs is determined analytically or empirically, it has been recognized that Gray coding of the type that is sometimes used in other arts (e.g., with shaft encoders) can be employed for minimizing the data loss that results from such confusion if the glyphs $g_1$–$g_4$ are ordered in accordance with their probability of being confused with each other.

Therefore, to reduce the bit error rate of the decoder 22, the glyphs $g_1$–$g_4$ are sorted into a cyclical sequence in accordance with their probability of being confused with each other, and the ordered glyphs then are assigned their respective encode values in accordance with a Gray code sequence. More rigorously, if $P_{ij}$ is the probability of identifying a glyph $g_i$ as a glyph $g_j$, a given ordering ($g_1$, $g_2$, ... $g_k$) of the glyphs is suitable for Gray coding only if the ordering satisfies both of the following conditions for each glyph $g_i$:

$$P_{i,i} >> P_{i,i-1} > P_{i,L} \text{ for all L, where abs}[L-1]>1,$$
and
$$P_{i,i} >> P_{i,i+1} > P_{i,L} \text{ for all L, where abs}[L-1]>1$$

The full significance of these expressions will be evident only if it is noted that the subscripts represent a modulo number, $J=(J-1)_{MODk}$. Therefore, $k+1=k_{MODk}+1=0+1=1$, and $1-1=(-1)_{MODk}+1=(k-1)+1=k$. The symbol ">>", on the other hand, merely means that there is a sufficiently low probability of confusing the glyphs to hold the contribution that such confusion makes to the overall bit error rate of the decoder 22 to an acceptably low level for a given application (clearly, the contribution that can be tolerated depends on a number of additional variables, but that subject is beyond the scope of this invention).

As is known, a Gray code is a binary code in which sequential numbers are represented by binary expressions, each of which differs from the preceding number in one bit position only. See, *IEEE Standard Dictionary of Electrical and Electronic Terms*. Thus, once the glyphs for a code having $M=2^n$ discriminable glyph shapes are sorted into a cyclical ordered sequence of the above-described type, such that each of the glyphs is adjacent in the ordered sequence to the two glyphs with which it is most likely to be confused (this state exists for any given glyph if only if there are no other glyphs in the sequence with which the given glyph is more likely to be confused), encoding values are assigned to the ordered glyphs in accordance with a Gray code for digital values of bit length n. For example, returning to FIG. 3, where $n=2$ and $M=4$, an appropriate cyclical ordering of the glyphs $g_1$–$g_4$ typically would be $g_1$, $g_2$, $g_3$, $g_4$, $g_1$, $g_2$, $g_3$ . . . , so the respective values that the glyphs $g_1$, $g_2$, $g_3$ and $g_4$ have been assigned to encode conform to a Gray code sequence; 00, 01, 11, 10, 00, 01, 11 . . . .

As will be appreciated, there are a finite number of n-bit long Gray codes for any finite n. For example, there are two Gray codes for $n=2$, and they are reversed sequences. Consequently, it is to be understood that this invention can be carried out by assigning n-bit long encoding values to any properly ordered set of $2^n$ glyphs in accordance with any cyclic ordering of any n-bit long Gray code. In Gray codes for $n>2$, the values of the higher order bits change less frequently than the values of the lower order bits when cycling through the code. These higher order bits, therefore, tend to be somewhat more reliable than the lower order bits, so they advantageously are given preference or increased weight by processes, such as error correction (not shown), that operate essentially directly on the digital values recovered by the decoder 22.

CONCLUSION

In view of the foregoing, it will now be understood that the present invention provides a technique for reducing the bit error rates of decoders for self-clocking glyph codes. It also will be understood that this invention can be applied to virtually any glyph code that encodes multi-bit digital values as multi-bit long bit strings.

What is claimed:

1. A method for reducing bit errors in reading self-clocking glyph codes that encode n-bit long multi-bit digital values in a set of $2^n$ graphically discriminable glyphs, said method comprising the steps of identifying a cyclical serial ordering of said glyphs wherein each glyph is an adjacent neighbor of the glyphs with which it is most likely to be confused during said reading, and assigning successive n-bit long Gray code values to said glyphs in accordance with said ordering, whereby the value encoded by each of said glyphs differs from the values encoded by the glyphs with which it is most likely to be confused by just one bit position.

2. The method of claim 1 wherein said glyphs have different rotational orientations, and
said digital values are encoded in the rotational orientations of said glyphs.

3. The method of claim 2 wherein said glyphs are elongated symbols.

4. The method of claim 3 wherein the rotational orientations of said glyphs are angularly displaced from each other by substantially equal angular increments.

5. The method of any one of claims 1-4 wherein said cyclical ordering of said glyphs is determined analytically.

6. The method of any one of claims 1-4 wherein said cyclical ordering of said glyphs is determined empirically.

* * * * *